United States Patent

Pfeuffer

[15] 3,658,367
[45] Apr. 25, 1972

[54] PIPE JOINT

[72] Inventor: Anton Pfeuffer, 301 East 78th Street, New York, N.Y. 10021

[22] Filed: Jan. 14, 1970

[21] Appl. No.: 2,876

Related U.S. Application Data

[63] Continuation-in-part of Ser. No. 662,844, Aug. 16, 1967, Pat. No. 3,498,649, which is a continuation-in-part of Ser. No. 518,151, Jan. 3, 1966, abandoned.

[52] U.S. Cl...........................285/177, 285/334.5, 285/410
[51] Int. Cl........................................................F16l 25/00
[58] Field of Search..............285/334.5, 365, 366, 367, 407, 285/408, 409, 410, 411, 424, 354, 223, 234, 177, 233

[56] References Cited

UNITED STATES PATENTS

| 966,513 | 8/1910 | Avery | 285/407 X |
| 1,662,954 | 3/1928 | Broido | 285/334.5 X |
| 2,552,768 | 5/1951 | Brophy | 285/334.5 X |

FOREIGN PATENTS OR APPLICATIONS

| 374,517 | 2/1964 | Switzerland | 285/223 |

Primary Examiner—Dave W. Arola
Attorney—Nolte and Nolte

[57] ABSTRACT

A joint for flanged conduit ends associated with conduits of different diameters and including at least one annular sealing ring, the flanged ends being held together by a clamping ring and the parts being shaped and assembled to minimize exposure of the sealing ring to the fluid passing through the conduit.

2 Claims, 5 Drawing Figures

PIPE JOINT

This is a continuation-in-part of application Ser. No. 662,844, filed Aug. 16, 1967, now U.S. Pat. No. 3,498,649 which was a continuation-in-part of application Ser. No. 518,151, filed Jan. 3, 1966 now abandoned.

The prior applications just cited disclose means for joining pipe ends, one or both of which are flared, such that the continuity of fluid flow past the joint will not be disturbed, particularly by providing a smooth inner surface of uniform diameter. According to the present invention joints of the same type are modified to connect tube or pipe ends having different diameters, the joints thus constituting "reducers," but without the addition or interposition of a separate fitting.

Practical embodiments of the invention are shown in the accompanying drawing, wherein:

FIG. 1 represents an elevation, partly broken away and in section, of a pipe joint similar to that shown and claimed in application Ser. No. 662,844, now U.S. Pat. No. 3,498,649.

Figure 1:
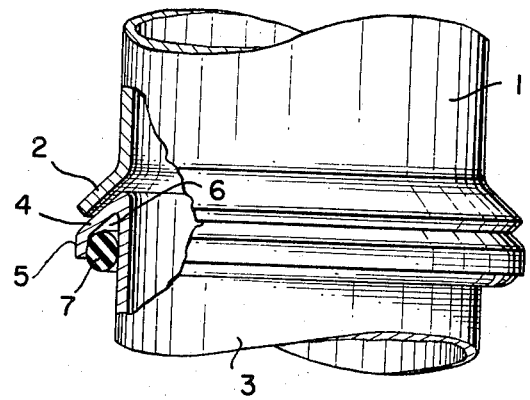

Referring to the drawings, the conduit 1 is provided with a simple flare 2, as by means of a flaring tool, shown as lying at an angle of about 45° to the axis of the conduit. The conduit 3 is provided with a double reverse flare having a first zone 4 turned back through an angle of about 135° from its original position parallel to the axis of the conduit and a second zone 5 turned through an additional angle of about 45° to lie parallel to said axis. The returned zones 4 and 5 form, with the adjacent unflared end portion of the conduit 3, an annular channel 6 adapted to receive an O-ring 7.

The joint is completed by the application of a channeled clamp, described below in connection with FIGS. 4 and 5.

The facing surfaces of flare 2 and zone 4 may, without additional sealing means, engage tightly enough to constitute a first seal, or one or both of said surfaces may be faced with an annular layer of sealing material or may be provided with a flat washer or gasket (not shown), as disclosed in application Ser. No. 662,844. A second seal is formed by the engagement of a side of the clamp with the O-ring 7, as described below, and compression of the O-ring into the channel 6 helps to hold the zone 4 somewhat resiliently against the flare 2, as just described.

Figure 2:
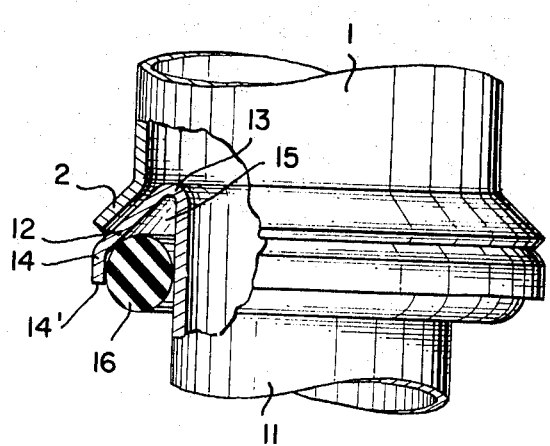
FIG. 2 represents a similar view of a joint modified to connect conduits of different diameters.

In the reduction joint of FIG. 2, the smaller conduit 11 is provided with a double reverse flare, as in the case of conduit 3, but the first zone 12 is extended radially outwardly (after being turned through about 135° as indicated at 13) to a distance approximately matching the radial extent of the flare 2 and is then turned through an additional angle of about 45° to form a second zone 14, corresponding to zone 5 in FIG. 1, lying parallel to the axis of the conduits and terminating in an edge 14'. The returned zones 12 and 14 form, with the adjacent unflared end portion of the conduit 11, an annular channel 15 adapted to receive an O-ring 16. This O-ring must be thicker than the O-ring 7 in order to project out of the channel 15, as before, and to be engaged by a side of the clamp, which can be used as well on the reduction joint of FIG. 2 as on the straight joint of FIG. 1. The sealing engagement between flare 2 and zone 12 may be effected and assured in the same manner as described above, referring to flare 2 and zone 4.

Figure 3:
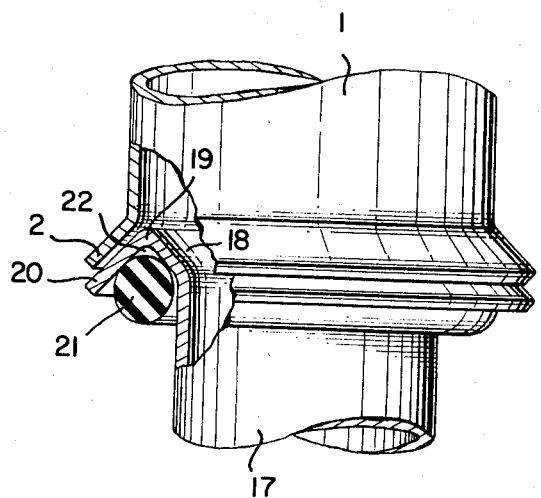
FIG. 3 represents a similar view of a joint like that of FIG. 2, but modified to improve the fluid flow characteristics.

In the reduction joint of FIG. 3 the smaller conduit 17 is shown as being flared first through a zone 18 at an angle of about 45° to the axis of the conduit and extending radially outwardly to a distance near or equal to the internal radius of the larger conduit 1. A single reverse flare, at an angle of about 90° to that of zone 18 at the ridge line 19, forms a second zone 20, lying substantially parallel to the flare 2 on the conduit 1. An O-ring 21 is accommodated partially within the annular pocket 22 formed by the zones 18 and 20 and the adjacent end portion of the conduit 17. When a clamp, such as the clamp 23, FIGS. 4 and 5, is applied to this joint, it holds the flare 2 and zone 20 together in sealing engagement, as explained with reference to flare 2 and zone 4 in FIG. 1, and also forms a second seal by engagement with the protruding portion of O-ring 21.

Figure 4:
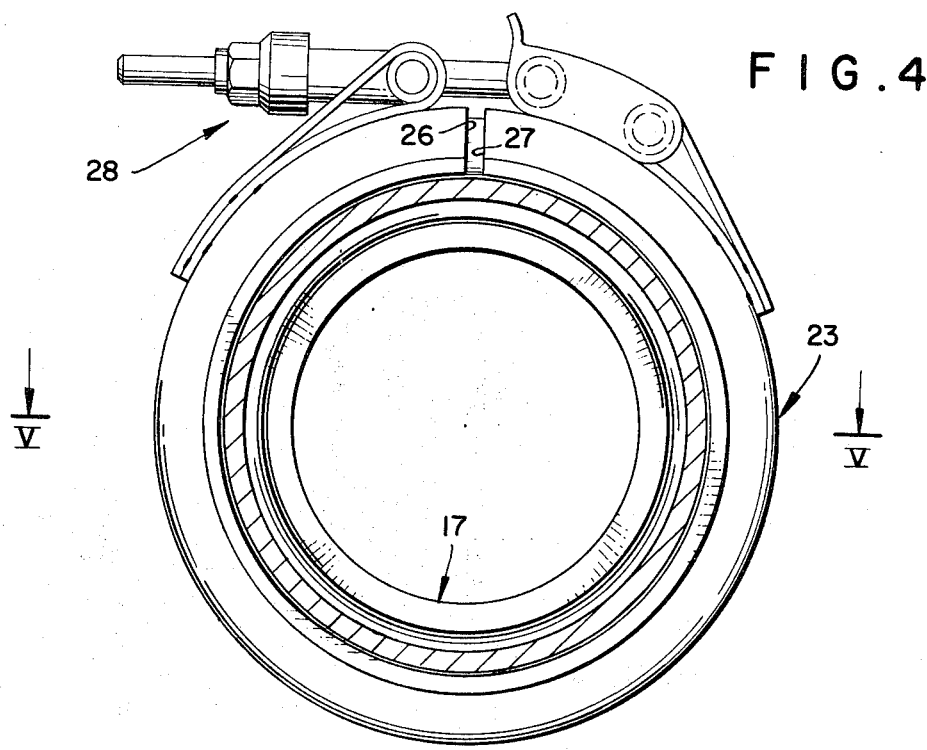
FIG. 4 represents an elevational view, partly broken away, of a channeled clamp applied, for example, to a joint of the type shown in FIG. 3.
Figure 5:
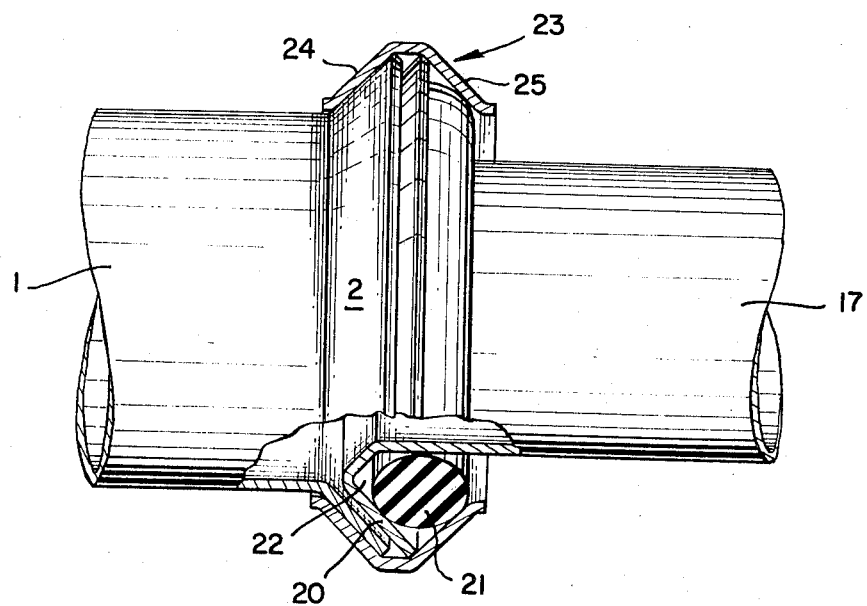
FIG. 5 represents an elevational view, with the clamp and part of the joint in section, on the line V—V of FIG. 4.

In FIGS. 4 and 5 there is shown the application to the joint shown in FIG. 3 of a clamp 23 which is, by way of example, the clamp shown in Mahoff et al., U.S. Pat. No. 2,602,678. This clamp is constituted by an annular channel having sloping sides 24, 25 and so dimensioned that its ends 26, 27 can be brought close together when the clamp is tightened around a joint. The sides 24, 25 may suitably be symmetrical and the angle of slope corresponds to the angle of the flare 2 on the pipe 1. With the side 24 resting against the flare 2, the side 25 bears against the O-ring 21, forcing it into the pocket 22 and forming a second seal to supplement that effected between flare 2 and zone 20.

The clamp may be drawn tight by means of the nut and bolt assembly 28, as described in U.S. Pat. No. 2,602,678, or by such other means as may be desired (e.g., Jacobs U.S. Pat. No. 1,009,141). A clamp for use on the joints of FIGS. 1 and 2 is similar to clamp 23, but has its sloping sides spaced sufficiently to accommodate the zones 5 or 14.

What I claim is:

1. A pipe joint comprising, a first conduit having an end flaring outwardly at an angle of less than 90° from the axis of said conduit, a second conduit having a diameter smaller than the diameter of said first conduit and an outwardly flared end constituted by at least two annular zones, at least one of said two zones lying at an angle of more than 90° to the axis of said second conduit and one of said two zones having a surface lying parallel to and in sealing relation with the flare of the first conduit when said conduit ends are juxtaposed, one of said two zones which does not have a surface lying parallel to the flare of said first conduit being located at an angle of less than 90° to the axis of said second conduit and extending between the unflared portion of said second conduit and the zone parallel to the flare of said first conduit, an O-ring disposed in contact with adjacent surfaces of said two zones, and clamping means bearing against said flare and said O-ring to hold said zone surface in sealing relation with said flare and to form with said O-ring a second seal.

2. A pipe joint according to claim 1 in which said two zones are joined along a line corresponding approximately to the circumference of the interior of the first conduit.

* * * * *